United States Patent
Takahashi et al.

(10) Patent No.: US 8,743,048 B2
(45) Date of Patent: Jun. 3, 2014

(54) ELECTROCHROMIC DISPLAY ELEMENT, DISPLAY DEVICE AND INFORMATION APPARATUS

(75) Inventors: Hiroyuki Takahashi, Kanagawa (JP);
Yoshinori Okada, Kanagawa (JP);
Tohru Yashiro, Kanagawa (JP);
Akishige Murakami, Miyagi (JP);
Shigenobu Hirano, Kanagawa (JP);
Yoshihisa Naijo, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 136 days.

(21) Appl. No.: 13/307,122

(22) Filed: Nov. 30, 2011

(65) Prior Publication Data
US 2012/0139824 A1    Jun. 7, 2012

(30) Foreign Application Priority Data

Dec. 7, 2010   (JP) .................................. 2010-272303
Oct. 21, 2011  (JP) .................................. 2011-231329

(51) Int. Cl.
G09G 3/38    (2006.01)

(52) U.S. Cl.
USPC .......................................... 345/105; 359/274

(58) Field of Classification Search
USPC .......... 345/105; 359/265, 267, 269, 270, 273, 359/274
See application file for complete search history.

(56) References Cited

U.S. PATENT DOCUMENTS

| | | | |
|---|---|---|---|
| 7,333,259 B2 | 2/2008 | Hirano et al. | |
| 7,474,322 B2 | 1/2009 | Takahashi et al. | |
| 2006/0204866 A1 | 9/2006 | Hirano et al. | |
| 2007/0024948 A1 | 2/2007 | Hirano et al. | |
| 2007/0171148 A1* | 7/2007 | Cassidy | 345/49 |
| 2008/0013152 A1 | 1/2008 | Hirano et al. | |
| 2010/0109834 A1* | 5/2010 | Kosowsky et al. | 338/314 |
| 2010/0309215 A1* | 12/2010 | Yamada | 345/589 |
| 2011/0222139 A1 | 9/2011 | Naijo et al. | |

FOREIGN PATENT DOCUMENTS

| | | |
|---|---|---|
| CN | 101872602 | 10/2010 |
| JP | 2003-121883 | 4/2003 |
| JP | 2006-106669 | 4/2006 |
| JP | 3934420 | 3/2007 |
| JP | 3955641 | 5/2007 |
| JP | 2007-171781 | 7/2007 |
| JP | 2008-116718 | 5/2008 |
| JP | 2010-33016 | 2/2010 |
| WO | WO 98/35267 | 8/1998 |
| WO | WO 01/27690 A2 | 4/2001 |
| WO | WO 2010/126121 A1 | 11/2010 |

OTHER PUBLICATIONS

Chinese official action (and English translation thereof) dated Nov. 29, 2013 in corresponding Chinese patent application No. 2011 10 46 3200.7.

* cited by examiner

Primary Examiner — Latanya Bibbins
(74) Attorney, Agent, or Firm — Cooper & Dunham LLP (57) ABSTRACT

A disclosed electrochromic display element includes a display substrate, a counter substrate facing the display substrate, display electrodes arranged between the display substrate and the counter substrate, electrochromic layers formed on the respective display electrodes, a plurality of drive elements arranged on the counter substrate at predetermined intervals, a plurality of pixel electrodes arranged on the drive elements, a charge retention layer formed over the pixel electrodes as a continuous layer, the charge retention layer being formed of a mixed film including a polymer and one of electric conductive microparticles and semiconductor microparticles, and an electrolyte layer sandwitched between the display substrate and the charge retention layer.

3 Claims, 6 Drawing Sheets

| CHARGE RETENTION LAYER | | DURABILITY (1000 TIMES) | IMAGE BLURRING |
|---|---|---|---|
| SURFACE RESISTANCE (OHM/SQUARE) | FILM THICKNESS ($\mu$m) | | |
| 1.0E+07 | 0.43 | DURABLE | NONE |
| 6.1E+06 | 0.84 | DURABLE | NONE |
| 3.1E+06 | 0.35 | DURABLE | NONE |
| 1.5E+06 | 1.2 | DURABLE | NONE |
| 1.0E+06 | 0.64 | DURABLE | NONE |
| 9.3E+05 | 1.6 | DURABLE | PRESENT (SEVERAL MINUTES LATER) |
| 8.9E+05 | 0.85 | DURABLE | PRESENT (SEVERAL MINUTES LATER) |
| 6.2E+05 | 1.1 | DURABLE | PRESENT (IMMEDIATELY AFTER COLOR DEVELOPMENT) |
| 2.0E+05 | 2.3 | DURABLE | PRESENT (IMMEDIATELY AFTER COLOR DEVELOPMENT) |
| — | 0 | NONDURABLE | NONE |

ELECTROCHROMIC DISPLAY ELEMENT, DISPLAY DEVICE AND INFORMATION APPARATUS

BACKGROUND OF THE INVENTION

1. Field of the Invention

The disclosures generally relate to an electrochromic display element, a display device and an information apparatus, and more specifically relate to a reflective electrochromic display element, a display device having such an reflective electrochromic display element and an information apparatus having such a display device.

2. Description of the Related Art

Electronic paper has been increasingly developed as information media replacing ordinary paper. Such electronic paper is generally formed of a display element. It is desirable that the display element utilized for the electronic paper be (1) a reflective display element, include (2) high white reflectance, (3) a high contrast ratio, (4) capability of exhibiting high-definition display, (5) capability of exhibiting memory effects and (6) capability of being driven by a low voltage, and be (7) light and thin, and (8) inexpensive. In particular, it is desirable that the display element utilized for the electronic paper include the white reflectance and the contrast ratio as high as those of the ordinary paper.

Various types of display elements have been proposed for use in the electronic paper. Examples of the proposed display elements include a reflective liquid crystal display element utilizing a reflective liquid crystal, an electrophoretic display element utilizing electrophoresis and a display element utilizing toner migration. However, the proposed display elements may not be able to exhibit a multicolor display while maintaining the white reflectance and the contrast ratio as high as those of the ordinary paper.

In general, display elements include different color filters for displaying multiple color. However, since the color filters themselves absorb light, the display elements provided with the color filters lower their reflectance. Further, since each pixel is divided into three color parts of Red (R), Green (G) and Blue (B) in the display element provided with the color filters, the reflectance of the display element may significantly be lowered.

If the white reflectance and the contrast ratio of the display element are significantly lowered, the visibility of the display element may be significantly lowed. Hence, the display element may not be suitable for use in the electronic paper.

As a potential reflective display element, a technology utilizing "electrochromism" has been put forward.

Electrochromism is a phenomenon displayed by specific materials of reversibly changing optical properties when an amount of voltage is applied to the materials. Most general examples of such specific materials exhibiting "electrochromism" include chemical compounds, which induce a reversible redox reaction to reversibly change their colors when a voltage is applied to the chemical compounds. The specific materials exhibiting "electrochromism" are hereinafter called "electrochromic compounds".

Electrochromid display elements are defined as display elements utilizing color development/color dissipation of the electrochromic coumpounds.

The electrochromic display element is a reflective display element, has memory effects, and capable of being driven by a low voltage. Accordingly, the electrochromic display element has been extensively studied as one of the promising candidates for display devices utilized for the electronic paper, from material development to device design.

Further, since the electrochromic display elements are capable of developing various colors based on various structures of electrochromic compounds, the electrochromic display elements are expected to be utilized as multicolor display elements.

For example, Japanese Patent Application Publication No. 2003-121883 (hereinafter referred to as "Patent Document 1") discloses an electrochromic display element having an organic electrochromic layer formed of polymeric microparticle layers.

Japanese Patent Application Publication No. 2006-106669 (hereinafter referred to as "Patent Document 2") discloses a multicolor display element having different electrochromic compositions or different electrochromic layers that develop different colors.

Japanese Patent Application Publication No. 2010-33016 (hereinafter referred to as "Patent Document 3") discloses an electrochromic display device having different electrochromic layers arranged corresponding to different display electrodes.

Further, Japanese Patent No. 3934420 (hereinafter referred to as "Patent Document 4") discloses an electrochromic display element capable of reducing its switching time. The disclosed electrochromic display element includes a first nanostructured film formed of electric conductive metal oxides on the display electrode. The first nanostructured film is formed on the display electrode in order to retain the electrochromic compound. The disclosed electrochromic display element further includes a second nanostructured film formed of electric conductive metal oxides on the counter electrodes. The second nanostructured film is formed on the counter electrodes in order to retain a counter material, which is a material inducing a reversed-phase redox reaction from the redox reaction of the electrochromic compound. That is, the electrochromic display element disclosed in Patent Document 4 has the first and second nanostructured films having large specific surface areas for retaining the respective electrochromic compound and counter material, which may increase color developing or color dissipating efficiency and reduce the switching time of the electrochromic display elements. The nanostructured films formed of electric conductive metal oxides utilized in the electrochromic display element disclosed in Patent Document 4 are low resistance films appropriately doped at a metallic level having surface resistivity less than 1.0E+05 ohm/square and a film thickness of approximately 3 μm.

In the development of practical electronic paper utilizing the electrochromic display element, thin-film transistors (TFTs) may frequently be utilized as drive elements. In the TFT, pixel electrodes (i.e., counter electrodes) are arranged at microintervals. If the low resistance layer disclosed in Patent Document 4 is formed on such pixel electrodes prepared as above, the low resistance layer may need to be separately formed on each of the pixel electrodes arranged at microintervals.

In this case, if the low resistance layer is continuously formed over the pixel electrodes (i.e., covered with one low resistance layer) in order to simplify a complicated fabrication process, color interfusion or image blurring may occur due to electric charge diffusion at the time of driving the electrochromic display element to develop or dissipate colors. As a result, the color may not be developed in a desired shape or exhibit insufficient development, which may drastically degrade display quality of the electrochromic display element.

In general, the electrochromic display element often deteriorates due to erosion caused by the electrolyte coming in contact with metal or electric conductive metal oxides utilized as the electrodes (counter electrodes in particular), and hence, some kind of practical protective layers may be necessary for protecting the electrodes from such erosion.

SUMMARY OF THE INVENTION

It is an object of one embodiment of the present invention to provide an electrochromic display element capable of exhibiting excellent display quality and being manufactured in a simpler process at low cost.

It is another object of one embodiment of the present invention to provide a display device capable of displaying information at high resolution and being fabricated without increasing manufacturing cost.

It is still another object of one embodiment of the present invention to provide an information apparatus capable of displaying information at high resolution and being fabricated without increasing manufacturing cost.

In one embodiment, there is provided an electrochromic display element that includes a display substrate; a counter substrate facing the display substrate; display electrodes arranged between the display substrate and the counter substrate; electrochromic layers formed on the respective display electrodes; a plurality of drive elements arranged on the counter substrate at predetermined intervals; a plurality of pixel electrodes arranged on the drive elements; a charge retention layer formed over the pixel electrodes as a continuous layer, the charge retention layer formed of a mixed film including a polymer and one of electric conductive microparticles and semiconductor microparticles; and an electrolyte layer sandwitched between the display substrate and the charge retention layer.

In another embodiment, there is provided a display device that includes the electrochromic display element; a video random access memory configured to store display data; and a display controller configured to control the plurality of the electrochromic display elements based on the display data stored in the video random access memory.

In still another embodiment, there is provided an information apparatus that includes the display device; and a controller device configured to display information on the display device.

Additional objects and advantages of the embodiments will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

BRIEF DESCRIPTION OF THE DRAWINGS

Other objects and further features of embodiments will be apparent from the following detailed description when read in conjunction with the accompanying drawings, in which.

DESCRIPTION OF THE PREFERRED EMBODIMENTS

Figure 1:
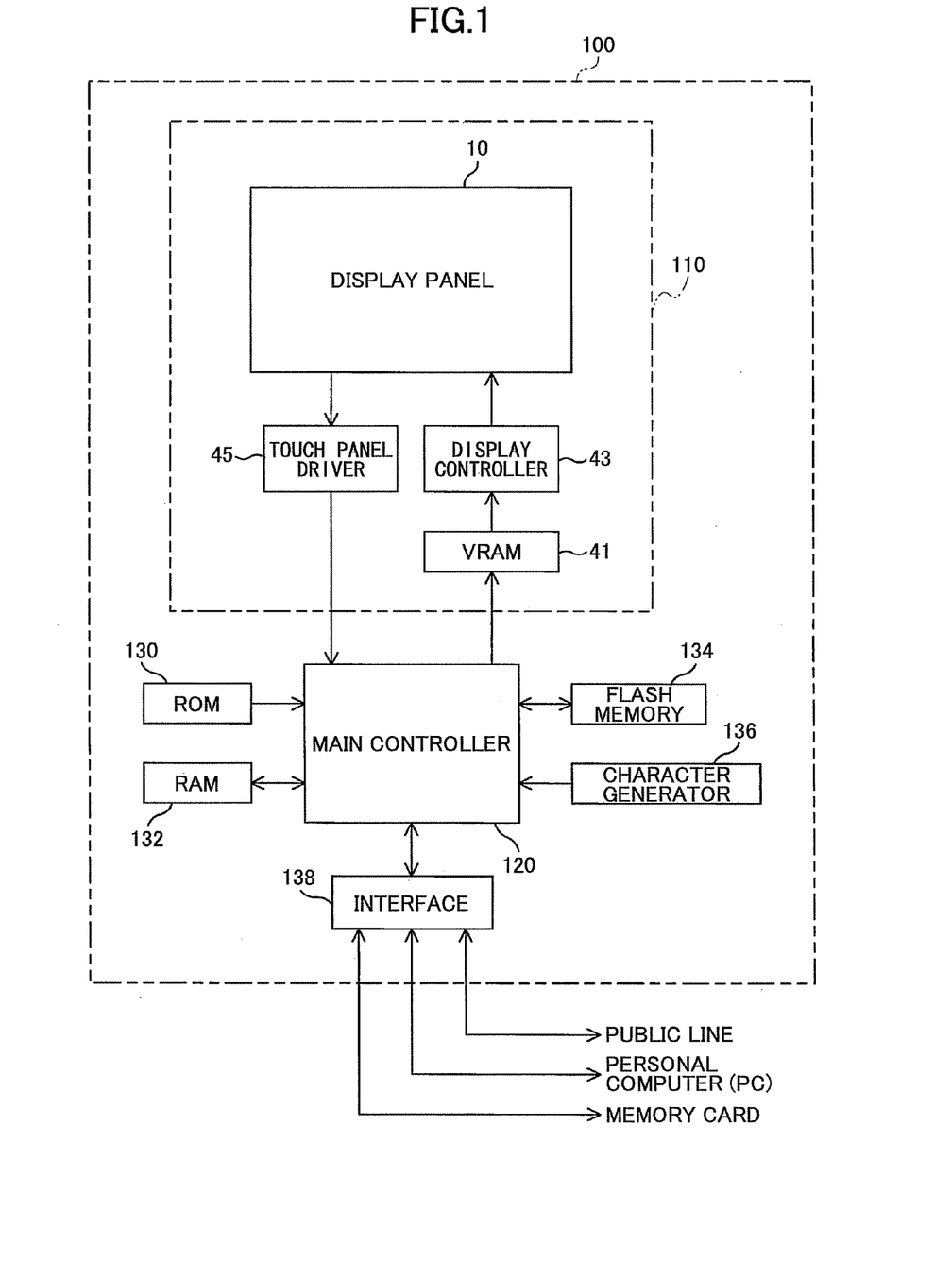
FIG. 1 is a schematic configuration diagram illustrating an electronic book reader according to an embodiment.

In the following, preferred embodiments will be described with reference to FIGS. 1 through 6. FIG. 1 is a schematic configuration diagram illustrating an electronic book (e-book) reader 100 according to an embodiment.

The e-book reader 100 includes a display device 110, a main controller (controller device) 120, a ROM 130, a RAM 132, a flash memory 134, a character generator 136 and an interface 138. Note that arrows in FIG. 1 indicate a typical signal flow or information flow and hence, they do not represent all connecting relationships between blocks.

The ROM 130 stores various programs written in corresponding codes decodable by the main controller 120 and various data required for executing the programs.

The RAM 132 is a working memory.

The flash memory 134 stores contents of e-books in a form of electronic data.

The character generator 136 stores dot data corresponding to various character data.

The interface 138 is configured to control connections between external apparatuses and the e-book reader 100. The interface 138 may be connected to a memory card, a personal computer PC and a public line (public circuit). Note that the interface 138 may be connected to the personal computer (PC) and the public line either wirelessly or with wires.

The display device 110 includes a display panel 10 provided with a touch panel, a video random access memory (VRAM) 41, a display controller 43 and a touch panel driver 45.

The display panel 10 is configured to display a full-color image formed of pixels (dots).

The VRAM 41 stores data to be displayed on the display panel 10 (hereinafter simply called "display data"). Note that the display data stored in the VRAM 41 correspond to plural pixels of the display panel 10, such that the display data include different display color information for each of the pixels.

The display controller 43 is configured to retrieve the display data stored in the VRAM 41 at a predetermined timing and individually control the respective pixels displayed on the display panel 10 based on the display data. In this configuration, the display controller 43 outputs to the display panel 10 a pixel selecting signal for allocating a pixel to develop its color and a color specifying signal for specifying color of the specified pixel.

The touch panel driver 45 outputs to the main controller 120 positional information indicating a user's touched position on the display panel 10.

The main controller 120 integrally controls the above-described components of the e-book reader 100 based on the programs stored in the ROM 130.

For example, when the user turns on the power, the main controller 120 retrieves initial menu image data from the ROM 130, converts the retrieved image data into dot data by referring to the character generator 136, and transfers the converted dot data to the VRAM 41. An initial menu screen is displayed on the display panel 10 in this manner. Note that a list of contents stored in the flash memory 134 is displayed in the initial menu screen.

When the user touches one of the menus displayed on the display panel 10 to select the menu, the main controller 120 acquires a corresponding content item selected by the user based on the positional information supplied by the touch panel driver 45.

For example, when the user requests browsing of one of the contents of the menu by selecting that content item, the main controller 120 retrieves electronic data of the corresponding content item from the flash memory 134, converts the retrieved electronic data into dot data by referring to the character generator 136, and transfers the converted dot data to the VRAM 41.

Further, when the user requests purchasing of contents of a desired e-book via the Internet, the main controller 120 accesses a predetermined purchase site of the desired book via the interface 138, and serves as an ordinary browser while the user proceeds to purchase the contents of the desired book. That is, the information on the purchase site is displayed on the display panel 10. When the user has purchased the contents of the desired book by downloading the electronic data of the contents from the purchase site, the main controller 120 stores the downloaded electronic data into the flash memory 134.

Next, the display panel 10 will be described below. The display panel 10 includes plural electrochromic display elements 20 and a drive circuit that drives each of the electrochromic display elements 20.

Figure 2:
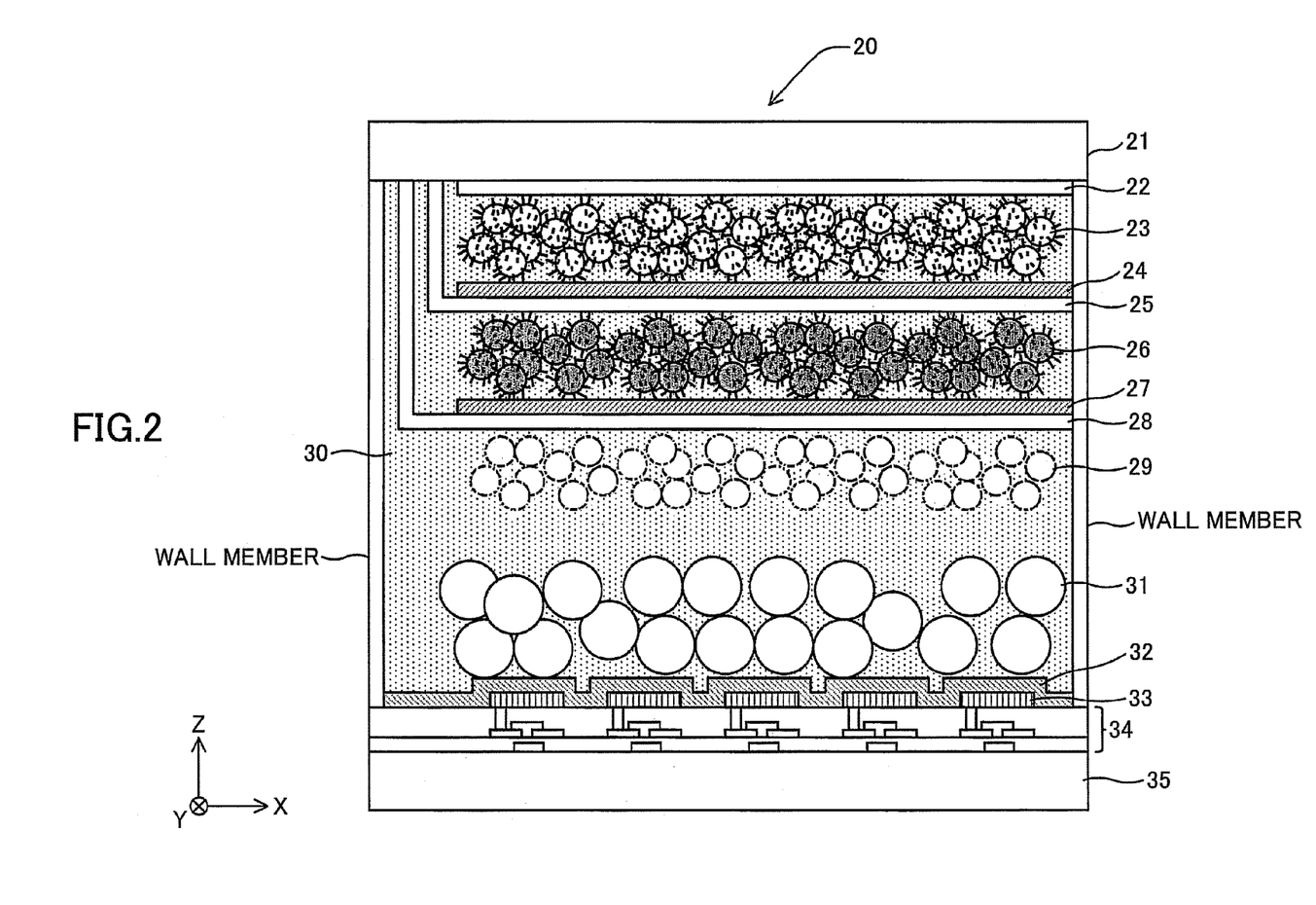
FIG. 2 is a diagram illustrating a configuration of an electrochromic display element.

FIG. 2 illustrates a configuration of one of the electrochromic display elements 20. The electrochromic display element 20 includes a display substrate 21, a first display electrode 22, a first electrochromic layer 23, an insulator layer 24, a second display electrode 25, a second electrochromic layer 26, an insulator layer 27, a third display electrode 28, a third electrochromic layer 29, an electrolyte layer 30, a white reflective layer 31, a charge retention layer (high resistive layer) 32, pixel electrodes (counter electrodes) 33, a thin film transistor (TFT) layer 34 and a counter substrate 35.

Note that in FIG. 2, a Z-axis direction is defined as a direction perpendicular to a surface of the display substrate 21 in an XYZ three-dimensional orthogonal coordinate system.

The display substrate 21 is a transparent substrate that may be made of glass or a plastic film.

The first display electrode 22 is configured to develop the color of the first electrochromic layer 23.

The second display electrode 25 is configured to develop the color of the second electrochromic layer 26.

The third display electrode 28 is configured to develop the color of the third electrochromic layer 29.

The first, second and third display electrodes are transparent electrodes that may be made of indium tin oxide (ITO), fluorine doped tin oxide (FTO), antimony tin oxide (ATO), and the like.

The first electrochromic layer 23 is configured to develop a cyan color.

The second electrochromic layer 26 is configured to develop a magenta color.

The third electrochromic layer 29 is configured to develop a yellow color.

The gradation of the color of the first, second and third electrochromic layers may be varied with levels of the voltage applied between the first, second and third display electrodes, respectively, and the pixel electrodes 33.

Each of the first, second and third electrochromic layers includes electrochromic compounds known in the art, such as pigment-based electrochromic compounds, polymer-based electrochromic compounds, metal complex electrochromic compounds and metal oxide electrochromic compounds.

Specific examples of the polymer-based electrochromic compounds and pigment-based electrochromic compounds include low molecular organic electrochromic compounds such as azobenzene compounds, anthraquinone compounds, diarylethene compounds, dihydroprene compounds, dipyridine compounds, styryl compounds, styryl spiropyran compounds, spirooxazine compounds, spiro thiopyran compounds, thioindigo compounds, tetrathiafulvalene compounds, terephthalic acid compounds, triphenylmethane compounds, triphenyl amine compounds, naphthopyran compounds, viologen compounds, pyrazoline compounds, phenazine compounds, phenylene diamine compounds, phenoxazine compounds, phenothiazine derivative phthalocyanine compounds, fluorane compounds, fulgide compounds, benzopyran compounds, the metallocene compounds compounds, or high molecular compounds such as polyaniline and polythiophene.

It is preferable that the polymer-based electrochromic compounds and pigment-based electrochromic compounds include the dipyridine compounds disclosed, for example, in Japanese Patent No. 3955641 and Japanese Patent Application Publication No. 2007-171781, or the viologen compounds disclosed, for example, in Japanese Patent Application Publication No. 2007-171781 and Japanese Patent Application Publication No. 2008-116718. The dipyridine compounds and the viologen compounds exhibit color development and color dissipation at low electric potentials, and exhibit adequate color values.

Examples of the metal oxide electrochromic compounds include a tungsten oxide, a molybdenum oxide, an iridium oxide, an indium oxide, a titanium oxide, a nickel oxide, a vanadium oxide and prussian blue.

Figure 3:
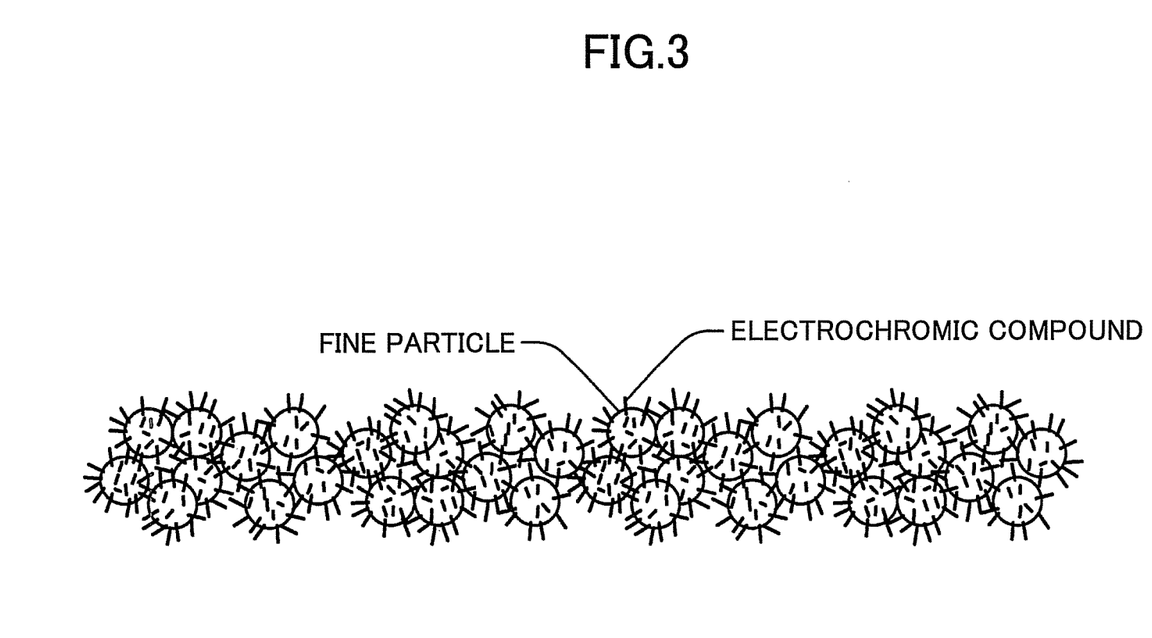
FIG. 3 is a diagram illustrating an electrochromic layer.

In this embodiment, the electrochromic compounds are carried on the electric conductive microparticles or semiconductor microparticles as illustrated in an example of an electrochromic layer in FIG. 3.

Specifically, microparticles having a particle size range of 5 to 50 nm are applied to corresponding surfaces of the display electrodes, which are then heated under a predetermined condition (temperature and duration), such that the microparticles applied on the surfaces of the display electrodes are partially bonded to the corresponding display electrodes, and the microparticles are partially bonded among themselves. Organic electrochromic compounds having polar groups such as a phosphonic acid group, a carboxyl group and a silanol group are adsorbed onto surfaces of the microparticles.

In an electrochromic layer having the above structure, since electrons are efficiently injected into the organic electrochromic compounds utilizing large surface areas of the microparticles, the organic electrochromic compounds may exhibit high densities of the developed colors and high rates (speeds) of color development and color dissipation. Further, the electrochromic layer utilized in this embodiment may be changed into a transparent layer utilizing the microparticles, and hence the electrochromic layer may acquire high white reflectance. Note that the microparticles may retain various organic electrochromic compounds.

Examples of the electric conductive microparticles and semiconductor particles preferably include, but not limited to, metal oxides. More specifically, examples of the electric conductive microparticles and semiconductor particles include metal oxides as major components, examples of which include a titanium oxide, a zinc oxide, a tin oxide, a zirconium oxide, a cerium oxide, a yttrium oxide, a boron oxide, a magnesium oxide, a strontium titanate, a potassium titanate, a barium titanate, a calcium titanate, a calcium oxide, a hafnium oxide, a tungsten oxide, an iron oxide, a copper oxide, a nickel oxide, a cobalt oxide, a barium oxide, a strontium oxide, a vanadium oxide, calcium phosphate, and aluminosilicate.

The above metallic oxides may be used alone or in combination of two or more. Note that if higher speeds of responses are required in color development and color dissipation, it is preferable to use any one of, or a mixture of, the titanium oxide, zinc oxide, tin oxide, zirconium oxide, iron oxide, magnesium oxide, indium oxide and tungsten oxide. The use of the titanium oxide as the electric conductive microparticles and semiconductor particles may particularly increases the speeds of responses in color development and color dissipation.

Further, shapes of the electric conductive microparticles and semiconductor particles may not be particularly specified. However, it is preferable that the electric conductive microparticles and semiconductor particles include a large surface area per unit volume (hereinafter called a "specific surface area"). For example, if the electric conductive microparticles and semiconductor particles are a nanoparticle aggregation that has a large specific surface area, the electric conductive microparticles and semiconductor particles may be able to efficiently retain the electrochromic compounds.

The insulator layer 24 is provided between the first electrochromic layer 23 and the second display electrode 25 such that the insulator layer 24 electrically insulates the first electrochromic layer 23 from the second display electrode 25, and vice versa.

The insulator layer 27 is provided between the second electrochromic layer 26 and the third display electrode 28 such that the insulator layer 27 electrically insulates the second electrochromic layer 26 from the third display electrode 28, and vice versa.

With this configuration, the color development and color dissipation of the first electrochromic layer 23, the second electrochromic layer 26 and the third electrochromic layer 29 are separately controlled, and hence, wthe electrochromic display element 20 may display full-color images.

The insulator layers 23 and 27 may not be particularly specified and may be formed of any porous insulator materials; however, it is preferable that the insulator layers 23 and 27 be formed of insulator materials capable of exhibiting excellent insulation, durability and deposition properties. It is particularly preferable that the insulator layers 23 and 27 be formed of materials at least containing ZnS. The materials containing ZnS may be deposited at high deposition speeds without damaging the electrochromic layers. Examples of the materials containing ZnS as a major component include ZnO—SiO$_2$, ZnS—SiC, ZnS—Si and ZnS—Ge.

In the electrolyte layer 30, ions are migrated between the display electrodes and the counter electrodes (pixel electrodes) to move charges, which may cause color developing reaction and color dissipation reaction of the respective electrochromic layers. Thus, the respective lectrochromic layers are arranged inside the electrolyte layer 30.

The electrolyte layer 30 may be formed of inorganic ion salts such as an alkali metal salt or an alkaline earth metal salt, a quaternary ammonium salt or acid, and alkaline supporting electrolyte. Specifically, the electrolyte layer 30 may be formed of LiClO$_4$, LiBF$_4$, LiAsF$_6$, LiPF$_6$, LiCF$_3$SO$_3$, LiCF$_3$COO, KCl, NaClO$_3$, NaCl, NaBF$_4$, NaSCN, KBF$_4$, Mg(ClO$_4$)$_2$, and Mg(BF$_4$)$_2$.

The electrolyte layer 30 may be formed of ionic liquid. In particular, an organic ionic liquid includes a molecular structure that exhibits liquidity with a large temperature range including room temperature. Examples of a cationic component of such an organic ionic liquid having the molecular structure include aromatic salts such as imidazole derivatives including "N,N-dimethylimidazolium salts", "N,N-methylethylimidazolium salts" and "N,N-methylpropylimidazolium salts"; pyridinium derivatives including "N,N-methylpropylpyridinium salts"; or aliphatic quaternary ammonium salts such as tetraalkylammonium salts including "trimethylpropylammonium salts", "trimethylhexylammonium salts" and "triethylhexylammonium salts".

Preferable examples of an anionic component of such an organic ionic liquid having the molecular structure include compounds containing fluorine including "BF$_4$—", "CF$_3$SO$_3$—", "PF$_4$—" and "(CF$_3$SO$_2$)$_2$N—" in view of stability in the atmosphere.

Alternatively, the ionic liquid having the molecular structure that is prescribed based on a combination of the above cationic component and the anionic component may be used. These ionic liquids may directly be dissolved in any of photopolymerized monomers, oligomers and liquid crystal materials. Note that if the above ionic liquids exhibit inferior solubility, they may be dissolved in a small amount of a solvent such as propylene carbonate, acetonitrile, γ-butyrolactone, ethylene carbonate, sulfolane, dioxolane, tetrahydrofuran, 2-methyl tetrahydrofuran, dimethyl sulfoxide, -dimethoxyethane, -ethoxymethoxy ethane, polyethylene glycol, and alcohols, and then the obtained solution may be mixed with any of the photopolymerized monomers, oligomers and liquid crystal materials.

The white reflective layer 31 is utilized for improving white reflectivity. The white reflective layer 31 may be formed by dispersing white pigment particles in the electrolyte layer 30. Examples of the white pigment particles include titanium oxides, aluminum oxides, zinc oxides, silica, cesium oxides and yttrium oxides.

The charge retention layer (high resistive layer) 32 may act as a buffer between the respective display electrodes and the pixel electrodes 33 when receiving charges, which may reduce the voltage applied between the respective display electrodes and the pixel electrodes 33. As a result, durability in repeating color development and color dissipation may be improved.

The charge retention layer 32 may be formed of a mixed film of a polymer and one of electric conductive microparticles and semiconductor microparticles.

Examples of the polymer for forming the mixed film include, but are not limited to, an acrylic material, an alkyd material, a fluorine material, an isocyanate material, a urethane material, an amino material, an epoxy material and a phenolic material.

Examples of the electric conductive microparticles for forming the mixed film include ITO, FTO and ATO. Examples of the semiconductor microparticles for forming the mixed film include oxides such as titanium, zirconium, hafnium, chrome, molybdenum, tungsten, vanadium, niobium, tantalum, silver, zinc, strontium, iron and nickel.

The mixed film may be formed by mixing the polymer material and the microparticle material, dispersing the mixture of the polymer material and the microparticle material into a disperse medium, and applying the obtained dispersion onto the pixel electrodes 33 by spin-coating, blade-coating or other printing methods. In this case, the dispersion may not have to be selectively applied to the pixel electrodes 33 alone, but may be applied to parts between the pixel electrodes 33. Workability in manufacturing the electrochromic display elements may be improved, which may lower the manufacturing cost compared to the manufacturing cost of the electrochromic display elements without having the charge retention layer.

In the charge retention layer 32, the mixing ratio of the polymer material and the microparticle material for forming the mixed film, and the film thickness of the mixed film may not have any restrictions. However, it is preferable that the obtained mixed film have surface resistivity of 1.0E+06 ohm/square or above. If the charge retention layer 32 satisfies the above condition, the drive voltage of the electrochromic display element 20 may be stabilized without being increased, the electrochromic display element 20 may exhibit excellent color development and color dissipation, the durability of the electrochromic display element 20 in repeating color development and color dissipation may be improved, and the electrochromic display element 20 may secure high definition images by suppressing diffusion of the charges in the film planer direction to reduce the image blurring. That is, the electrochromic display element 20 may be able to obtain high definition images without allowing the electric charges to mutually affect the adjacent pixels to develop or dissipate corresponding colors.

In the meantime, it is preferable that the electrochromic compounds of the respective electrochromic layers be either formed of an oxidized color development material or formed of a reduced color development material. At this time, it is particularly preferable that the micropartilces to be mixed with the polymer material be formed of ATO if the electrochromic compounds of the respective electrochromic layers are formed of the oxidized color development material. On the other hand, it is particularly preferable that the micropartilces to be mixed with the polymer material be formed of a tungsten oxide if the electrochromic compounds of the respective electrochromic layers are formed of the reduced color development material. In either of the above cases (i.e., utilizing the oxidized and reduced color development materials), the drive voltage of the electrochromic display element 20 is lowered and the durability of the electrochromic display element 20 in repeating color development and color dissipation is improved.

The pixel electrodes 33 are arranged corresponding to the respective pixels of the display panel 10, and configured to control electric potentials of the respective display electrodes. Materials for the pixel electrodes 33 need not be particularly specified insofar as the materials have electric conductivity. Examples of the materials for the pixel electrodes 33 include a transparent conductive film such as ITO, FTO or a zinc oxide, a metallic conductive film such as zinc or platinum, or carbon.

The color development and color dissipation of the first electrochromic layer 23 may be controlled by controlling the voltage applied between the first display electrode 22 and the pixel electrodes 33.

Further, the color development and color dissipation of the second electrochromic layer 26 may be controlled by controlling the voltage applied between the second display electrode 25 and the pixel electrodes 33.

Moreover, the color development and color dissipation of the third electrochromic layer 29 may be controlled by controlling the voltage applied between the third display electrode 28 and the pixel electrodes 33.

The TFT layer 34 is provided between the pixel electrodes 33 and the counter substrate 35 having drive elements corresponding to the respective pixel electrodes 33. That is, each of the pixel electrodes 33 is arranged on a corresponding one of the drive elements of the counter substrate 35.

In this embodiment, the pixel selecting signal is supplied from the display controller 43 to drive a drive element corresponding to a pixel selected based on the pixel selecting signal supplied from the display controller 43, and a predetermined voltage is then applied to the selected pixel. Note that the pixel selecting signal is configured to allocate a position of the selected pixel in a vertical direction and a horizontal direction in a fashion similar to that of a related art liquid crystal display (LCD).

Further, the color specifying signal is supplied from the display controller 43 to apply a predetermined voltage to the display electrode corresponding to the color specified based on the color specifying signal.

Next, a manufacturing procedure of the electrochromic display element 20 is described.

(1) Preparation of Precursor of Electrolyte Layer

Initially, a tetrabutylammonium perchlorate (TBAP)/polypropylene carbonate (PC) solution is prepared. The concentration of TBAP in this TBAP/PC solution is 2 mol/l.

Then, the mixture (Product Name: "PNM-170" available from DIC Corporation of Japan) of PNLC liquid crystal composition, monomer composition and polymerization initiator is added to the TBAP/PC solution.

The TBAP concentration in the resulting solution is adjusted approximately to 0.04 mol/l. The adjusted solution is utilized as a precursor of an electrolyte layer.

Thereafter, in order to regulate a thickness of the electlyte layer to be formed, spherical resin beads having a particle size of 10 μm are dispersed in the electrolyte layer precursor such that the concentration of the dispersed spherical resin beads is 0.2 wt %.

(2) Preparation of Display Electrodes, Electrochromic Layers and White Reflective Layer An ITO film is deposited at a thickness of approximately 100 nm on an entire surface of a glass substrate (40*40 mm) utilized as the display substrate 21 by sputtering to prepare the first display electrode 22. The surface resistivity of the first display electrode 22 is approximately 200 ohm/square.

Titanium oxide nanoparticle dispersion (Product Name: "SP210" produced by Showa Titanium Corporation) is spin-coated on the first display electrode 22 and is then annealed at 120° C. for 15 minutes to form a titanium oxide-particle film.

Subsequently, a solution of 2,2,3,3-tetrafluoropropanol (hereinafter called a "TFP") containing 1 wt % of 4,4'-(isooxazole-3,5-diyl)bis(1-(2-phosphonoethyl)pyridinium)bromide utilized as an electrochromic compound is applied onto the titanium oxide-particle film by spin-coating and then annealed at 120° C. for 10 minutes to form the first electrochromic layer 23 composed of titanium oxide particles and the electrochromic compound.

Subsequently, a 0.1 wt % poly(N-vinylacetamide) ethanol solution and a 0.5 wt % polyvinyl alcohol) aqueous solution are spin-coated on the first electrochromic layer 23 to form a protective layer.

$ZnS-SiO_2$ having a composition ratio of 8:2 is then deposited by sputtering on the protective layer to form the insulator layer 24 having a film thickness of 140 nm.

An ITO film is formed on the insulator layer 24 by sputtering such that a film thickness of the ITO film is approximately 100 nm, thereby forming the second display electrode 25. The surface resistivity of the second display electrode 25 is approximately 200 ohm/square.

The titanium oxide nano-particle dispersion "SP210" (produced by Showa Titanium Corporation) is spin-coated on the second display electrode 25 and then annealed at 120° C. for 15 minutes to form a titanimum oxide-particle film.

Subsequently, a TFP solution containing 1 wt % 4,4'-(1-phenyl-1H-pyrrole-2,5-diyl)bis(1-(4-(phosphonomethyl)benzyl)pyridinium)bromide (utilized as an electrochromic compound) is applied onto the titanium oxide-particle film by spin-coating and is then annealed at 120° C. for 10 minutes to form the second electrochromic layer 26 composed of titanium oxide particles and the electrochromic compound.

Subsequently, a 0.1 wt % poly(N-vinylacetamide) ethanol solution and a 0.5 wt % polyvinyl alcohol) aqueous solution are spin-coated on the second electrochromic layer 26 to form a protective layer.

ZnS—SiO$_2$ having a composition ratio of 8:2 is then deposited by sputtering on the protective layer to form the insulator layer 27 having a film thickness of 140 nm.

An ITO film is formed on the insulator layer 27 by sputtering such that a film thickness of the ITO film is approximately 100 nm, thereby forming the third display electrode 28. The surface resistivity of the third display electrode 28 is approximately 200 ohm/square.

The titanium oxide nano-particle dispersion "SP210" (produced by Showa Titanium Corporation) is spin-coated on the third display electrode 28 and then annealed at 120° C. for 15 minutes to form a titanimum oxide-particle film.

Subsequently, a TFP solution containing 1 wt % 4,4'-(4,4'-(1,3,4-oxadiazole-2,5-diyl)bis(4,1-phenylene))bis(1-(8-phosphonooctyl)pyridinium)bromide (utilized as an electrochromic compound) is applied onto the titanium oxide-particle film by spin-coating and then annealed at 120° C. for 10 minutes to form the third electrochromic layer 29 composed of titanium oxide particles and the electrochromic compound.

TFP dispersion composed of titanium oxides and aqueous polyurethane resin is spin-coated on the third electrochromic layer 29 and then annealed at 120° C. for 10 minutes to form white reflective layer 31.

The first, second and third display electrodes 22, 25 and 28, the first, second and third electrochromic layers 23, 26 and 29, and the white reflective layer 31 obtained as described above are then enclosed by wall members (see FIG. 2).

Note that a constructed body composed of the first, second and third display electrodes 22, 25 and 28, the first, second and third electrochromic layers 23, 26 and 29, the white reflective layer 31 and the wall members is called a "first constructed body" for convenience.

(3) Preparation of Pixel Electrodes and Charge Retention Layer

The TFT layer 34 having the drive elements at density of 140 ppi is formed on a glass substrate (40*40 mm) utilized as the counter substrate 35.

An ITO film is deposited at a thickness of approximately 100 nm on an entire surface of the TFT layer 34 by photolithography to form the pixel electrodes 33 corresponding to the drive elements of the TFT layer 34.

TFP dispersion composed of aqueous polyurethane resin and ATO nano-particles (produced by Mitsubishi Materials Corporation) is spin-coated over the pixel electrodes 33 and then annealed at 120° C. for 15 minutes to form the charge retention layer 32. Note that the mixing ratio of the ATO nano-particles and the polymer is 45:55 by weight percent The thickness of the charge retention layer 32 is 0.64 μm and the surface resistivity of the charge retention layer 32 is 1.0E+06 ohm/square.

Note that a constructed body composed of the pixel electrodes 33 and the charge retention layer 32 is called a "second constructed body" for convenience.

(4) Preparation of Electrochromic Display Element

The electrolyte layer precursor prepared in the above (1) is coated (injected) from an upper side of the white reflective layer 31 of the first constructed body prepared in the above (2).

The charge retention layer 32 of the second constructed body prepared in the above (3) is then superimposed on the electrolyte layer precursor coated white reflective layer 31.

The obtained product (the charge retention layer 32 superimposed on the electrolyte layer precursor coated white reflective layer 31) is irradiated with ultraviolet rays having a central wavelength of 365 nm at irradiation intensity of 50 mW/cm$^2$ for two minutes using a high-pressure mercury lamp, which allows the electrolyte layer precursor to undergo polymerization induced phase separation (PIPS) to form the electrolyte layer 30.

Next, when the drive elements of the thus formed electrochromic display element 20 are driven by a predetermined method, the first electrochromic layer 23, the second electrochromic layer 26 and the third electrochromic layer 29 display images, which allows the electrochromic display element 20 to display a clear color image. In this case, duration between a time at which the drive elements of the electrochromic display element 20 are driven and a time at which the electrochromic display element 20 displays the image is approximately 500 ms. Likewise, duration between a time at which the drive elements of the electrochromic display element 20 are driven and a time at which the electrochromic display element 20 dissipates the image is approximately 500 ms.

After the electrochromic display element 20 displays the color image, the electrochromic display element 20 is allowed to stand for 30 minutes while displaying the color image. The result illustrates that there is no significant change or image blurring observed in the displayed color image.

Next, display and dissipation of the color image are alternately repeated for 1000 times. However, there is no significant change observed in the display status of the color image after the repeated display and dissipation of the color image.

Figure 4:
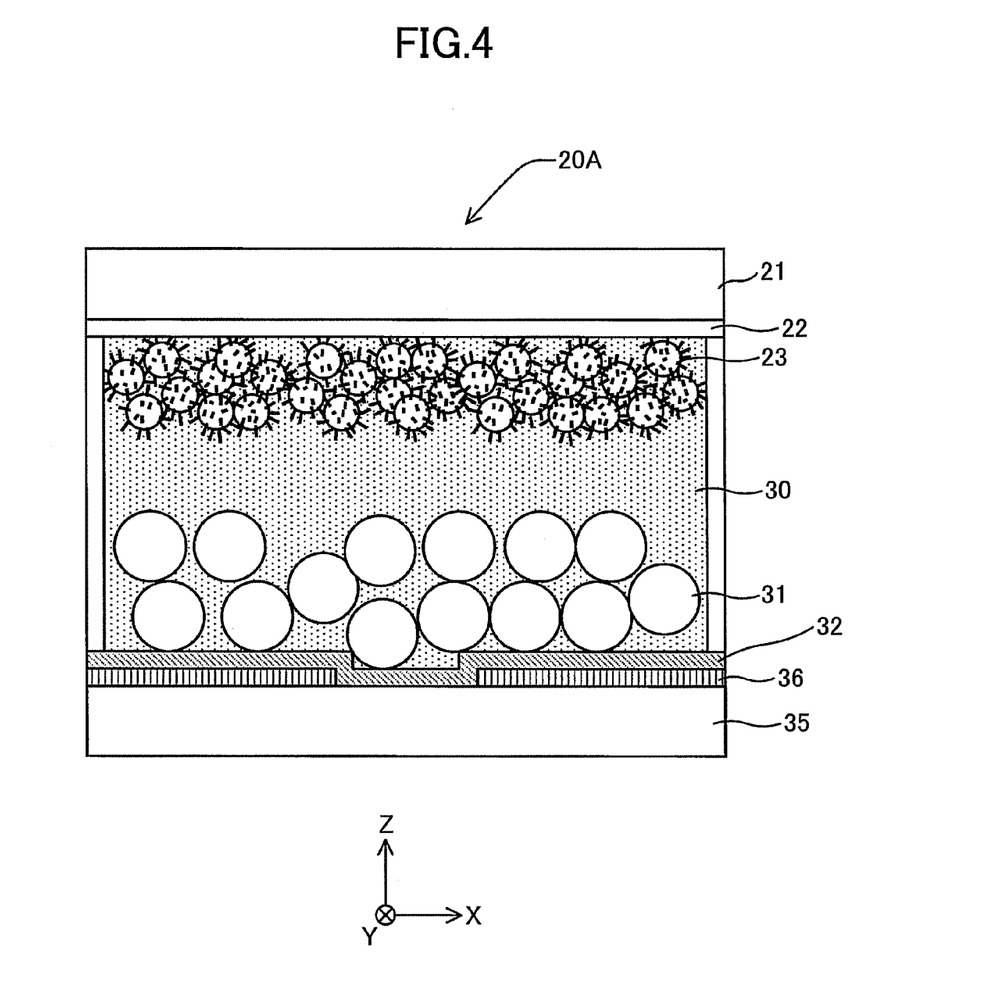
FIG. 4 is a diagram illustrating an evaluation electrochromic display element.

Next, an evaluation electrochromic display element 20A illustrated in FIG. 4 is prepared in order to verify the effect of the charge retention layer 32. Note that components of the evaluation electrochromic display element 20A identical or similar to those of the electrochromic display element 20 are provided with the same reference numerals and their descriptions are simplified or omitted.

The evaluation electrochromic display element 20A was provided with one electrochromic layer 23, and a counter electrode 36 having a line-width of 150 μm, a space of 150 μm and a line-length of 40 mm in place of the pixel electrodes 33.

When the voltage of 6 V is applied to a display electrode 22 of the evaluation electrochromic display element 20A utilized as an anode and the counter electrode 36 of the evaluation electrochromic display element 20A utilized as a cathode, the electrochromic layer 23 develops its color along the stripe pattern of the counter electrode 36. The electrochromic layer 23 has rapidly developed its color at approximately 500 ms. Subsequently, when the voltage of −6 V is applied, the electrochromic layer 23 has rapidly dissipated its color at approximately 500 ms.

In the electrochromic display element 20B, the electrochromic layer 23 is also allowed to stand for 30 minutes while displaying the color image. The result illustrates that there is no significant change or image blurring observed in the displayed color image. The displayed color image is measured further in detail by a length measuring microscope. The measured result illustrates that the width of the color developing stripe is 158 μm and the width of the color spread (interfusion) due to the charge diffusion is only 4 μm.

In the evaluation electrochromic display element 20A, display and dissipation of the color image are alternately repeated for 1000 times in a fashion similar to that of the electrochromic display element 20. However, there is no significant change observed in the color developing or dissipating operation, nor is there any display defect observed in the color development after the repeated display and dissipation of the color image.

Figure 5:
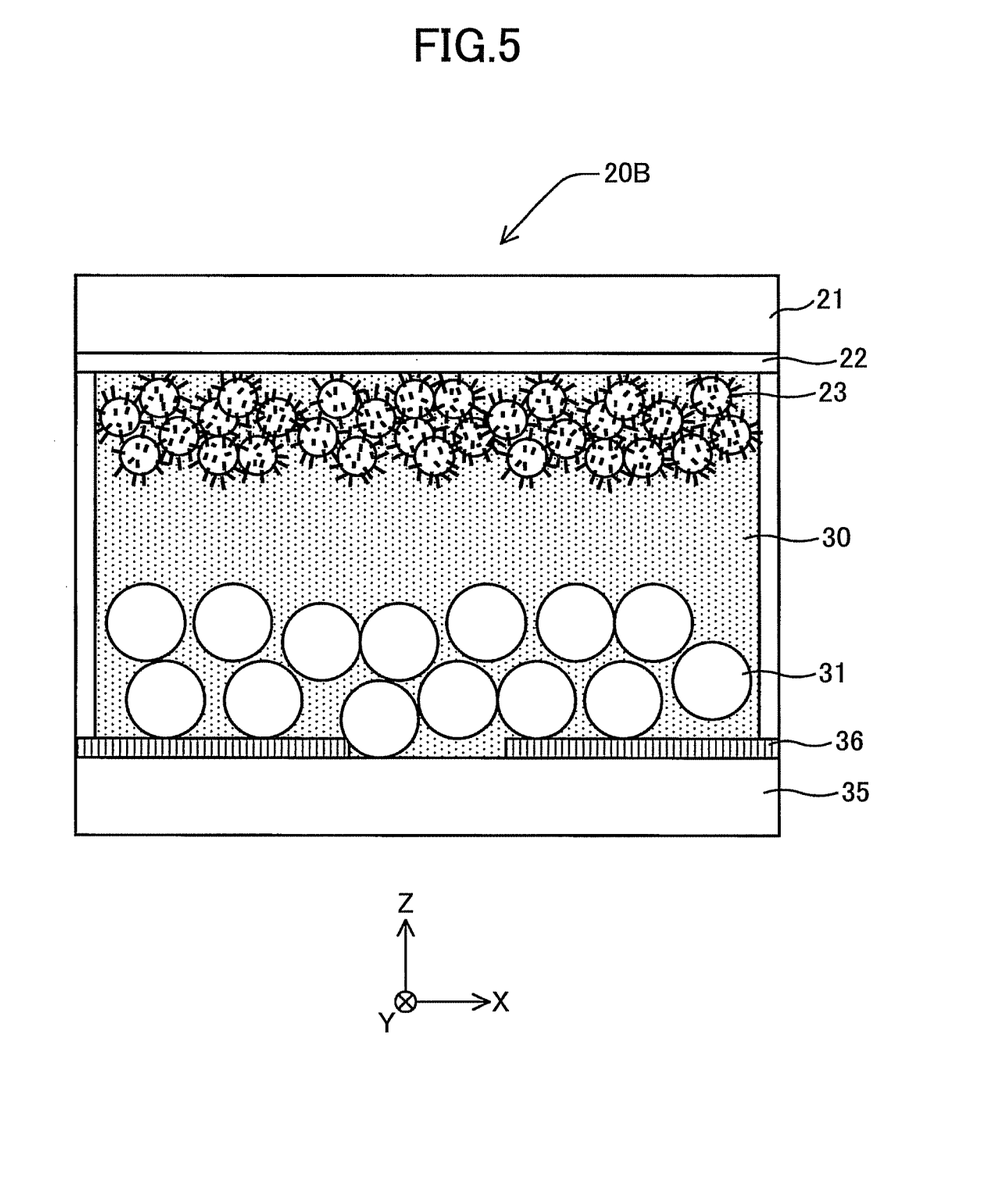
FIG. 5 is a diagram illustrating an electrochromic display element prepared as a comparative example.

FIG. 5 illustrates an electrochromic display element 20B, which is prepared as a comparative example 1 by excluding the charge retention layer 32 from the electrochromic display element 20A.

When the voltage of 6 V is applied to a display electrode 22 of the electrochromic display element 20B utilized as an anode and a counter electrode 36 of the electrochromic display element 20B utilized as a cathode, an electrochromic layer 23 develops its color along the stripe pattern of the counter electrode 36. The electrochromic layer 23 has rapidly developed its color at approximately 500 ms. Subsequently, when the voltage of −6 V is applied, the electrochromic layer 23 has rapidly dissipated its color at approximately 500 ms.

In the electrochromic display element 20B, the electrochromic layer 23 is also allowed to stand for 30 minutes while displaying the color image. The result illustrates that there is no significant change or image blurring observed in the displayed color image.

However, when the electrochromic display element 20B is caused to alternately repeat displaying and dissipating its color, the developed color density is gradually lowered and a significant display defect (color density variability) is observed in the color development after the electrochromic display element 20B has repeated displaying and dissipating its color about 400 times.

An electrochromic display element 20C was prepared as a comparative example 2 by changing the film thickness and the surface resistivity of the charge retention layer 32 in the electrochromic display element 20A into the film thickness of 2.3 μm and the surface resistivity of 2.0E+05 ohm/square, respectively.

When the voltage of 6 V is applied to a display electrode 22 of the electrochromic display element 20C utilized as an anode and a counter electrode 36 of the electrochromic display element 20C utilized as a cathode, significant image blurring is observed immediately after the color development, and an electrochromic layer 23 has developed unobservable color along the stripe pattern of the counter electrode 36.

Note that in the electrochromic display element 20C, display and dissipation of the color image are alternately repeated for 1000 times. However, there is no significant change observed in the color developing or dissipating operation after the repeated display and dissipation of the color image.

An electrochromic display element 20D was prepared as a comparative example 3 by changing the film thickness and the surface resistivity of the charge retention layer 32 in the electrochromic display element 20A into the film thickness of 1.1 μm and the surface resistivity of 6.2E+05 ohm/square, respectively.

When the voltage of 6 V is applied to a display electrode 22 of the electrochromic display element 20D utilized as an anode and a counter electrode 36 of the electrochromic display element 20D utilized as a cathode, significant image blurring is observed immediately after the color development, and an electrochromic layer 23 has developed unobservable color along the stripe pattern of the counter electrode 36.

Note that in the lectrochromic display element 20D, display and dissipation of the color image are alternately repeated for 1000 times. However, there is no significant change observed in the color developing or dissipating operation after the repeated display and dissipation of the color image.

An electrochromic display element 20E was prepared as a comparative example 4 by changing the film thickness and the surface resistivity of the charge retention layer 32 in the electrochromic display element 20A into the film thickness of 0.85 μm and the surface resistivity of 8.9E+05 ohm/square, respectively.

When the voltage of 6 V is applied to a display electrode 22 of the electrochromic display element 20E utilized as an anode and a counter electrode 36 of the electrochromic display element 20E utilized as a cathode, an electrochromic layer 23 has developed observable color along the stripe pattern of the counter electrode 36 immediately after the color development. However, the developed color stripe pattern has become unobservable several minutes later due to image blurring.

Note that in the lectrochromic display element 20E, display and dissipation of the color image are alternately repeated for 1000 times. However, there is no significant change observed in the color developing or dissipating operation after the repeated display and dissipation of the color image.

An electrochromic display element 20F is prepared as a comparative example 5. The electrochromic display element 20E is formed by preparing TFP dispersion composed of aqueous polyurethane resin and ATO nanoparticles (produced by Mitsubishi Materials Corporation) that includes the mixing ratio (wt %) of the ATO nanoparticles and the polymer of 30/70, and forming a charge retention layer 32 having the film thickness of 1.6 μm and the surface resistance of 9.3E+05 ohm/square.

When the voltage of 6 V is applied to a display electrode 22 of the electrochromic display element 20F utilized as an anode and a counter electrode 36 of the electrochromic display element 20F utilized as a cathode, an electrochromic layer 23 has developed observable color along the stripe pattern of the counter electrode 36 immediately after the color development. However, the developed color stripe pattern has become unobservable several minutes later due to image blurring.

Note that in the electrochromic display element 20F, display and dissipation of the color image are alternately repeated for 1000 times. However, there is no significant change observed in the color developing or dissipating operation after the repeated display and dissipation of the color image.

An electrochromic display element $20A_1$ is prepared as modification 1 of the electrochromic display element 20A by changing the film thickness and the surface resistivity of the charge retention layer 32 in the electrochromic display element 20A into the film thickness of 0.35 μm and the surface resistivity of 3.1E+05 ohm/square, respectively. The electrochromic display element $20A_1$ has exhibited results in color developing/color dissipating operations, image blurring and repeated durability approximately similar to the results obtained by the electrochromic display element 20A.

An electrochromic display element $20A_2$ was prepared as modification 2 of the electrochromic display element 20A. The electrochromic display element $20A_2$ was formed by preparing TFP dispersion composed of aqueous polyurethane resin and ATO nano-particles (produced by Mitsubishi Materials Corporation) that includes the mixing ratio (wt %) of the ATO nano-particles and the polymer of 30/70 and forming a charge retention layer 32 having the film thickness of 1.2 μm and the surface resistivity of 1.5E+06 ohm/square. The electrochromic display element $20A_2$ has exhibited results in color developing/color dissipating operations, image blurring and repeated durability approximately similar to the results obtained by the electrochromic display element 20A.

An electrochromic display element $20A_3$ was prepared as modification 3 of the electrochromic display element 20A. The electrochromic display element $20A_3$ was formed by preparing TFP dispersion composed of aqueous polyurethane resin and ATO nano-particles (produced by Mitsubishi Materials Corporation) that includes the mixing ratio (wt %) of the ATO nano-particles and the polymer of 30/70 and forming a charge retention layer 32 having the film thickness of 0.84 μm and the surface resistivity of 6.1E+06 ohm/square. The electrochromic display element $20A_3$ has exhibited results in color developing/color dissipating operations, image blurring and repeated durability approximately similar to the results obtained by the electrochromic display element 20A.

An electrochromic display element $20A_4$ was prepared as modification 4 of the electrochromic display element 20A. The electrochromic display element $20A_4$ was formed by preparing TFP dispersion composed of aqueous polyurethane resin and ATO nano-particles (produced by Mitsubishi Materials Corporation) that includes the mixing ratio (wt %) of the ATO nano-particles and the polymer of 30/70, and forming a charge retention layer 32 having the film thickness of 0.43 μm and the surface resistivity of 1.0E+07 ohm/square. The electrochromic display element $20A_4$ has exhibited results in color developing/color dissipating operations, image blurring and repeated durability approximately similar to the results obtained by the electrochromic display element 20A.

Figure 6:
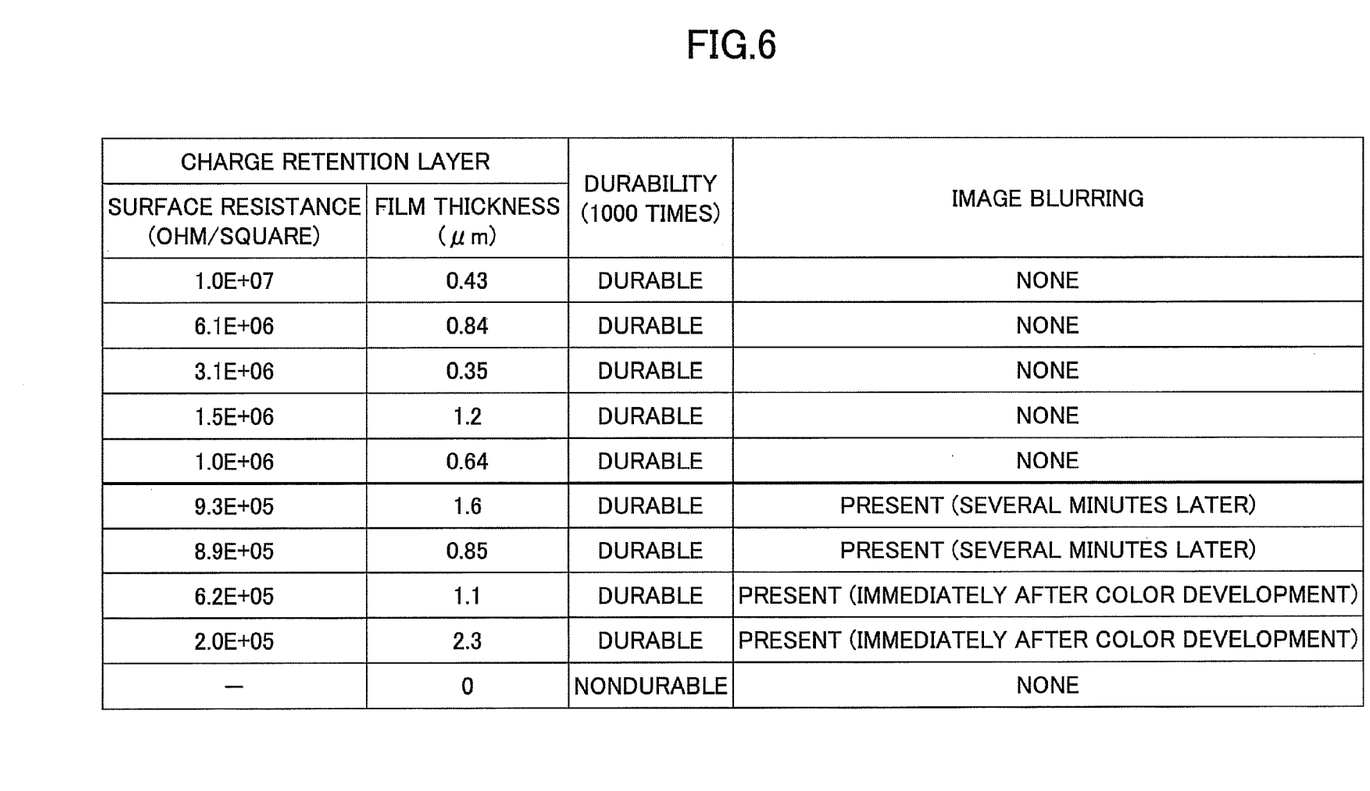
FIG. 6 is a diagram illustrating effects of a charge retention layer.

These results illustrate that if the electrochromic display element has a charge retention layer having surface resistance of 1.0E+06 ohm/square or above, the electrochromic display element may exhibit reduced image blurring and excellent repeated durability, as illustrated in FIG. 6.

As described above, the electrochromic display element 20 according to the embodiments includes the display substrate 21, the first display electrode 22, the first electrochromic layer 23, the insulator layer 24, the second display electrode 25, the second electrochromic layer 26, the insulator layer 27, the third display electrode 28, the third electrochromic layer 29, the electrolyte layer 30, the white reflective layer 31, the charge retention layer (high resistive layer) 32, the pixel electrodes (i.e., counter electrodes) 33, the thin film transistor (TFT) layer 34 and the counter substrate 35.

The charge retention layer 32 is formed of the mixed film of the polymer and the electric conductive microparticles or semiconductor microparticles and includes the surface resistivity of 1.0E+06 ohm/square or above.

With this configuration, the electrochromic display element 20 exhibits excellent durability in repeating color development and color dissipation and reduced image blurring. As a result, the display panel 10 formed of the electrochromic display elements 20 may stably display images at excellent resolution.

Further, the display panel 10 formed of the electrochromic display elements 20 may be produced by simpler methods in simple manufacturing processes, and as a result, the manufacturing cost may be reduced.

That is, the electrochromic display elements 20 having excellent display properties may be produced in a simper process at low cost.

Further, since the display device 110 includes such a display panel 10, the display device 110 capable of displaying specified information at excellent resolution may be produced without increasing the manufacturing cost.

Moreover, since the electronic book (e-book) reader 100 includes such a display device 110, the e-book reader 100 capable of displaying contents specified by users at excellent resolution may be produced without increasing the manufacturing cost.

Note that in the above embodiments, the electrochromic display element 20 includes three electrochromic layers; however, the electrochromic display element may not be limited to these embodiments. For example, if the display panel formed of the electrochromic display elements are used for monochrome display, each of the electrochromic display element 20 may include only one electrochromic layer.

Further, in the above embodiments, the display device 110 may include the character generator 136.

Moreover, in the above embodiments, the display panel 10 may not be provided with the touch panel if the display panel 10 includes other input units. In this case, the touch panel driver 45 is unnecessary.

Further, in the above embodiments, the information apparatus is described as the electronic book (e-book) reader 100. However, the information apparatus is not limited to the e-book reader but may be an electronic advertisement board, a mobile personal computer or a mobile phone. That is, the information apparatus may include the display device 110.

In one embodiment, there is provided an electrochromic display element that includes a display substrate; a counter substrate facing the display substrate; display electrodes arranged between the display substrate and the counter substrate; electrochromic layers formed on the respective display electrodes; a plurality of drive elements arranged on the counter substrate at predetermined intervals; a plurality of pixel electrodes arranged on the drive elements; a charge retention layer formed over the pixel electrodes as a continuous layer, the charge retention layer formed of a mixed film including a polymer and one of electric conductive microparticles and semiconductor microparticles; and an electrolyte layer sandwitched between the display substrate and the charge retention layer.

With this configuration, the electrochromic display element according to the above embodiments having excellent display properties may be produced in a simper process at low cost.

In another embodiment, there is provided a display device that includes the electrochromic display element; a video random access memory configured to store display data; and a display controller configured to control the plurality of the electrochromic display elements based on the display data stored in the video random access memory.

With this configuration, the display device according to the embodiments may display information at excellent resolution, which may be produced without increasing the manufacturing cost.

In still another embodiment, there is provided an information apparatus that includes the display device; and a controller device configured to display information on the display device.

With this configuration, the information apparatus according to the embodiments may display information at excellent resolution, which may be produced without increasing the manufacturing cost.

As described above, the electrochromic display element according to the above embodiments may include excellent display properties and may be produced at low cost. In addition, the image display device according to the embodiments may display information at excellent resolution, which may be produced without increasing the manufacturing cost. In addition, the information apparatus according to the embodiments may display information at excellent resolution, which may be produced without increasing the manufacturing cost.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiment of the present invention has been described in detail, it should be understood that various changes, substitutions, and alterations could be made hereto without departing from the spirit and scope of the invention.

This patent application is based on Japanese Priority Patent Application No. 2010-272303 filed on Dec. 7, 2010, and Japanese Priority Patent Application No. 2011-231329 filed on Oct. 21, 2011, the entire contents of which are hereby incorporated herein by reference.

What is claimed is:

1. An electrochromic display element comprising:
a display substrate;
a counter substrate facing the display substrate;
display electrodes arranged between the display substrate and the counter substrate;
electrochromic layers formed on the respective display electrodes;
a plurality of drive elements arranged on the counter substrate at predetermined intervals;
a plurality of pixel electrodes arranged on the drive elements;
a charge retention layer formed over the pixel electrodes as a continuous layer, the charge retention layer being formed of a mixed film including a polymer and one of electric conductive microparticles and semiconductor microparticles; and
an electrolyte layer sandwiched between the display substrate and the charge retention layer,
wherein the charge retention layer is formed of a high resistance layer having a surface resistivity of $1.0E+06$ ohm/square or above and reduces a voltage applied between the display electrodes and the pixel electrodes.

2. A display device comprising:
one or more electrochromic display elements each constituted like the electrochromic display element claimed in claim 1;
a video random access memory configured to store display data; and
a display controller configured to control the one or more electrochromic display elements based on the display data stored in the video random access memory.

3. An information apparatus comprising:
the display device as claimed in claim 2; and
a controller device configured to display information on the display device.

\* \* \* \* \*